United States Patent
Ajitomi et al.

(10) Patent No.: US 10,476,940 B2
(45) Date of Patent: Nov. 12, 2019

(54) COMMUNICATION DEVICE, COMMUNICATION SYSTEM, COMMUNICATION METHOD AND NON-TRANSITORY COMPUTER READABLE MEDIUM

(71) Applicant: KABUSHIKI KAISHA TOSHIBA, Tokyo (JP)

(72) Inventors: Daisuke Ajitomi, Tokyo (JP); Keisuke Minami, Kanagawa (JP); Hiroshi Kawazoe, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 180 days.

(21) Appl. No.: 15/263,056

(22) Filed: Sep. 12, 2016

(65) Prior Publication Data
US 2017/0272506 A1    Sep. 21, 2017

(30) Foreign Application Priority Data
Mar. 16, 2016    (JP) .................................. 2016-052883

(51) Int. Cl.
*H04L 29/08*    (2006.01)
*H04L 29/06*    (2006.01)

(52) U.S. Cl.
CPC ............ *H04L 67/10* (2013.01); *H04L 67/325* (2013.01); *H04L 67/42* (2013.01)

(58) Field of Classification Search
CPC ........ H04L 67/10; H04L 67/325; H04L 67/42
See application file for complete search history.

(56) References Cited

U.S. PATENT DOCUMENTS

| | | | |
|---|---|---|---|
| 9,386,170 B2 | 7/2016 | Nagasaki | |
| 9,479,395 B2 * | 10/2016 | Waas | G06F 11/0709 |
| 2005/0108720 A1 * | 5/2005 | Cervini | G06F 9/3851 |
| | | | 718/105 |
| 2013/0013747 A1 * | 1/2013 | Cranor | H04L 67/1034 |
| | | | 709/219 |

(Continued)

FOREIGN PATENT DOCUMENTS

| | | |
|---|---|---|
| JP | H9-198347 A | 7/1997 |
| JP | 2007-189495 A | 7/2007 |

(Continued)

*Primary Examiner* — Brian J. Gillis
*Assistant Examiner* — Chhian (Amy) Ling
(74) *Attorney, Agent, or Firm* — Finnegan, Henderson, Farabow, Garrett & Dunner, L.L.P.

(57) ABSTRACT

According to one embodiment, a communication device capable of communicating with each of a control device and a processing device through a network includes processing circuitry. The processing circuitry creates a job upon receiving a first request from the control device, the first request designating a content of a process that is executed by the processing device, the job containing information to instruct the processing device to execute the process and a first time limit relevant to the process. The processing circuitry controls transition among a plurality of states of the job. The processing circuitry controls, upon receiving a second request for the job from the processing device or the control device, execution of the second request, based on the first time limit and the state of the job.

14 Claims, 14 Drawing Sheets

(56) References Cited

U.S. PATENT DOCUMENTS

2014/0092431 A1* 4/2014 Okuno ................. G06F 3/1207
358/1.15
2014/0218762 A1 8/2014 Abe
2015/0248258 A1* 9/2015 Ding ..................... G06F 3/1222
358/1.15

FOREIGN PATENT DOCUMENTS

| JP | 2014-153891 | 8/2014 |
| JP | 2014-178908 A | 9/2014 |
| JP | 2015-198267 A | 11/2015 |

* cited by examiner

```
{
  "request":{"power":"on"}
}
```
(A) EXAMPLE OF JOB CREATION REQUEST

```
{
  "request":{"power":"on"},
  "requestExpiredIn": 3600,
  "responseExpiredIn": 36000
}
```
(B) EXAMPLE OF JOB CREATION REQUEST

FIG. 2

```
{
  "id":"123456789000",
  "requesterId": "alice",
  "responderId": "0724517763699939",
  "request":{"power":"on"},
  "requestExpiredIn": 3600,
  "responseExpiredIn": 3600,
  "createdAt":"2015-01-01T00:00:00",
}
```
EXAMPLE OF JOB CREATION RESPONSE

FIG. 3

| JOB ID | USER ID | DEVICE ID | PROCESS CONTENT | JOB STATE | EX- ECUTION STATUS | COM- PLETION ATTRIBUTE | CON- FIRMATION CODE | EX- ECUTION TIME LIMIT | VIEWING TIME LIMIT | JOB CRE- ATION TIME | JOB ASSIGN- MENT TIME | JOB EX- ECUTION TIME | INSPEC- TION TIME | ... |
|---|---|---|---|---|---|---|---|---|---|---|---|---|---|---|
| 12345 67890 00 | alice | 07245 17763 69993 9 | power: on | created | | | | 3600 | 3600 | 2015- 01- 01T00: 00:00 | | | | |
| 12345 67890 01 | ... | ... | ... | ... | | | | | | ... | ... | ... | ... | ... |
| 12345 67890 02 | ... | ... | ... | ... | | | | | | ... | ... | ... | ... | ... |

FIG. 4A

| JOB ID | USER ID | DEVICE ID | PROCESS CONTENT | JOB STATE | EXECUTION STATUS | COMPLETION ATTRIBUTE | CONFIRMATION CODE | EXECUTION TIME LIMIT | VIEWING TIME LIMIT | JOB CREATION TIME | JOB ASSIGNMENT TIME | JOB EXECUTION TIME | INSPECTION TIME |
|---|---|---|---|---|---|---|---|---|---|---|---|---|---|
| 1234567890 00 | alice | 0724517763 699939 | power: on | assigned | | | | 3600 | 3600 | 2015-01-01T00:00:00 | 2015-01-01T00:15:00 | | |
| 1234567890 01 | ... | ... | ... | ... | | | | ... | ... | ... | ... | ... | ... |
| 1234567890 02 | ... | ... | ... | ... | | | | ... | ... | ... | ... | ... | ... |

FIG. 4B

| JOB ID | USER ID | DEVICE ID | PROCESS CONTENT | JOB STATE | EXECUTION STATUS | COMPLETION ATTRIBUTE | CONFIRMATION CODE | EXECUTION TIME LIMIT | VIEWING TIME LIMIT | JOB CREATION TIME | JOB ASSIGNMENT TIME | JOB EXECUTION TIME | INSPECTION TIME | ... |
|---|---|---|---|---|---|---|---|---|---|---|---|---|---|---|
| 12345 67890 00 | alice | 07245 17763 69993 9 | power- on | executed | done | True | xd1a3f ap5i6f | 3600 | 3600 | 2015- 01- 01T00: 00:00 | 2015- 01- 01T00: 15:00 | 2015- 01- 01T00: 15:10 | | |
| 12345 67890 01 | ... | ... | ... | ... | | | | | | | | | ... | |
| 12345 67890 02 | ... | ... | ... | ... | | | | | | | | | ... | |

FIG. 4C

| JOB ID | USER ID | DEVICE ID | PROCESS CONTENT | JOB STATE | EX-ECUTION STATUS | COM-PLETION ATTRIBUTE | CON-FIRMATION CODE | EX-ECUTION TIME LIMIT | VIEWING TIME LIMIT | JOB CRE-ATION TIME | JOB ASSIGN-MENT TIME | JOB EX-ECUTION TIME | INSPEC-TION TIME | ... |
|---|---|---|---|---|---|---|---|---|---|---|---|---|---|---|
| 12345 67890 00 | alice | 07245 17763 69993 9 | power: on | confirmed | done | True | xd1a3f ap5i6f | 3600 | 3600 | 2015-01-01T00:00:00 | 2015-01-01T00:15:00 | 2015-01-01T00:15:10 | 2015-01-01T00:15:20 | ... |
| 12345 67890 01 | ... | ... | ... | ... | ... | ... | ... | ... | ... | ... | ... | ... | ... | ... |
| 12345 67890 02 | ... | ... | ... | ... | ... | ... | ... | ... | ... | ... | ... | ... | ... | ... |

FIG. 4D

```
{
   "jobs": [
  {"id":"123456789000",
    "requestExpiredIn": 3600,
    "responseExpiredIn": 3600,
    "createdAt":"2015-01-01T00:00:00",   },
  {"id":"123456789001",
    "requestExpiredIn": 3600,
    "responseExpiredIn": 3600,
    "createdAt":"2015-01-01T00:10:00",   }]
}
```

EXAMPLE OF JOB LIST ACQUISITION RESPONSE

FIG. 7

```
{
  "id":"123456789000",
  "requesterId": "alice",
  "responderId": "0724517763699939",
  "request":{"power":"on"},
  "requestExpiredIn": 3600,
  "responseExpiredIn": 3600,
  "createdAt":"2015-01-01T00:00:00",
  "assingedAt":"2015-01-01T00:15:00",
}
```

EXAMPLE OF JOB ACQUISITION RESPONSE

FIG. 8

```
{
  "response":{"status":"done"},
  "finished":true
}
```

EXAMPLE OF PROCESSING RESULT REGISTRATION REQUEST

FIG. 9

```
{
  "id":"123456789000",
  "requesterId": "alice",
  "responderId": "0724517763699939",
  "request":{"power":"on"},
  "response":{"status":"done"},
  "finished": true,
  "confirmationCode": "xd1a3fap5i6f",
  "requestExpiredIn": 3600,
  "responseExpiredIn": 3600,
  "createdAt":"2015-01-01T00:00:00",
  "assingedAt":"2015-01-01T00:15:00",
  "executedAt":"2015-01-01T00:15:10"
}
```

EXAMPLE OF PROCESSING RESULT REGISTRATION RESPONSE

FIG. 10

```
{
  "confirmationCode": "xd1a3fap5i6f",
}
```

EXAMPLE OF INSPECTION REQUEST

FIG. 11

```
{
  "id":"123456789000",
  "requesterId": "alice",
  "responderId": "0724517763699939",
  "request":{"power":"on"},
  "response":{"status":"done"},
  "finished": true,
  "confirmationCode": "xd1a3fap5i6f",
  "requestExpiredIn": 3600,
  "responseExpiredIn": 3600,
  "createdAt":"2015-01-01T00:00:00",
  "assingedAt":"2015-01-01T00:15:00",
  "executedAt":"2015-01-01T00:15:10",
  "confirmedAt":"2015-01-01T00:15:20"
}
```

EXAMPLE OF INSPECTION RESPONSE

FIG. 12

```
{
  "id":"123456789000",
  "requesterId": "alice",
  "responderId": "0724517763699939",
  "request":{"power":"on"},
  "requestExpiredIn": 3600,
  "responseExpiredIn": 3600,
  "subscriptionUrl": "wss://example.com/connect?id=xxxx"
  "createdAt":"2015-01-01T00:00:00",
}
```

EXAMPLE OF JOB CREATION RESPONSE CONTAINING NOTIFICATION URL

FIG. 13

COMMUNICATION DEVICE, COMMUNICATION SYSTEM, COMMUNICATION METHOD AND NON-TRANSITORY COMPUTER READABLE MEDIUM

CROSS-REFERENCE TO RELATED APPLICATIONS

This application is based upon and claims the benefit of priority from Japanese Patent Application No. 2016-052883, filed on Mar. 16, 2016; the entire contents of which are incorporated herein by reference.

An embodiment described herein relates to a communication device, a communication system, a communication method and a non-transitory computer readable medium.

BACKGROUND

There is known a job management server that receives a job execution request from a Web client. The job management server receives an execution request for a job issued from an application by the operation of a Web browser of a multifunction machine or a job issued based on a request from a mobile terminal or the like. On this occasion, the job management server preferentially executes the job issued from the application, and excludes the interruption of the job issued based on the request from the mobile terminal or the like.

This technology, which relates to an exclusive control and a priority control of the job, performs a control that corresponds to a requester of the job, but does not perform a control that depends on the type of the job, as exemplified by a life cycle (expiration time) control of the job. That is, in this technology, it is assumed that the life cycle of the job is a uniform life cycle that does not depend on the type of the job.

The same goes for a message queue in MQTT or the like, which is a protocol recently attracting attention in the context of IoT (Internet of Things). The message queue itself has no timeout management mechanism with a granularity of job type.

In the case where jobs having various life cycles are mixed, a uniform life cycle control causes a useless resource consumption in the server side. Specifically, there are sometimes mixed a job that requires an immediate processing and may be discarded if the immediate processing is not performed, as exemplified by a channel alteration of a television, and a job that has a relatively long suspended period until the execution, as exemplified by a record reservation of a television. When the timeout is set on the basis of the latter job that has the suspended period until the execution, the former job that may be discarded if the immediate processing is not performed brings about memory consumption, leading to the increase in the cost for the communication with the execution device for the job.

BRIEF DESCRIPTION OF THE DRAWINGS

FIG. 2 is a diagram showing examples of a job creation request;

FIG. 3 is a diagram showing an example of a job creation response;

FIG. 4A is a diagram showing an example of a database;

FIG. 4B is a diagram showing an example of the database;

FIG. 4C is a diagram showing an example of the database;

FIG. 4D is a diagram showing an example of the database;

FIG. 7 is a diagram showing an example of a job list acquisition response;

FIG. 8 is a diagram showing an example of a job acquisition response;

FIG. 9 is a diagram showing an example of a processing result registration request;

FIG. 10 is a diagram showing an example of a processing result registration response;

FIG. 11 is a diagram showing an example of a job result inspection request;

FIG. 12 is a diagram showing an example of an inspection response;

FIG. 13 is a diagram showing an example of the merging of a destination URL into the job creation response;

DETAILED DESCRIPTION

According to one embodiment, a communication device capable of communicating with each of a control device and a processing device through a network includes processing circuitry. The processing circuitry creates a job upon receiving a first request from the control device, the first request designating a content of a process that is executed by the processing device, the job containing information to instruct the processing device to execute the process and a first time limit relevant to the process. The processing circuitry controls transition among a plurality of states of the job. The processing circuitry controls, upon receiving a second request for the job from the processing device or the control device, execution of the second request, based on the first time limit and the state of the job.

Hereinafter, an embodiment of the present invention will be described with reference to the drawings.

Figure 1:
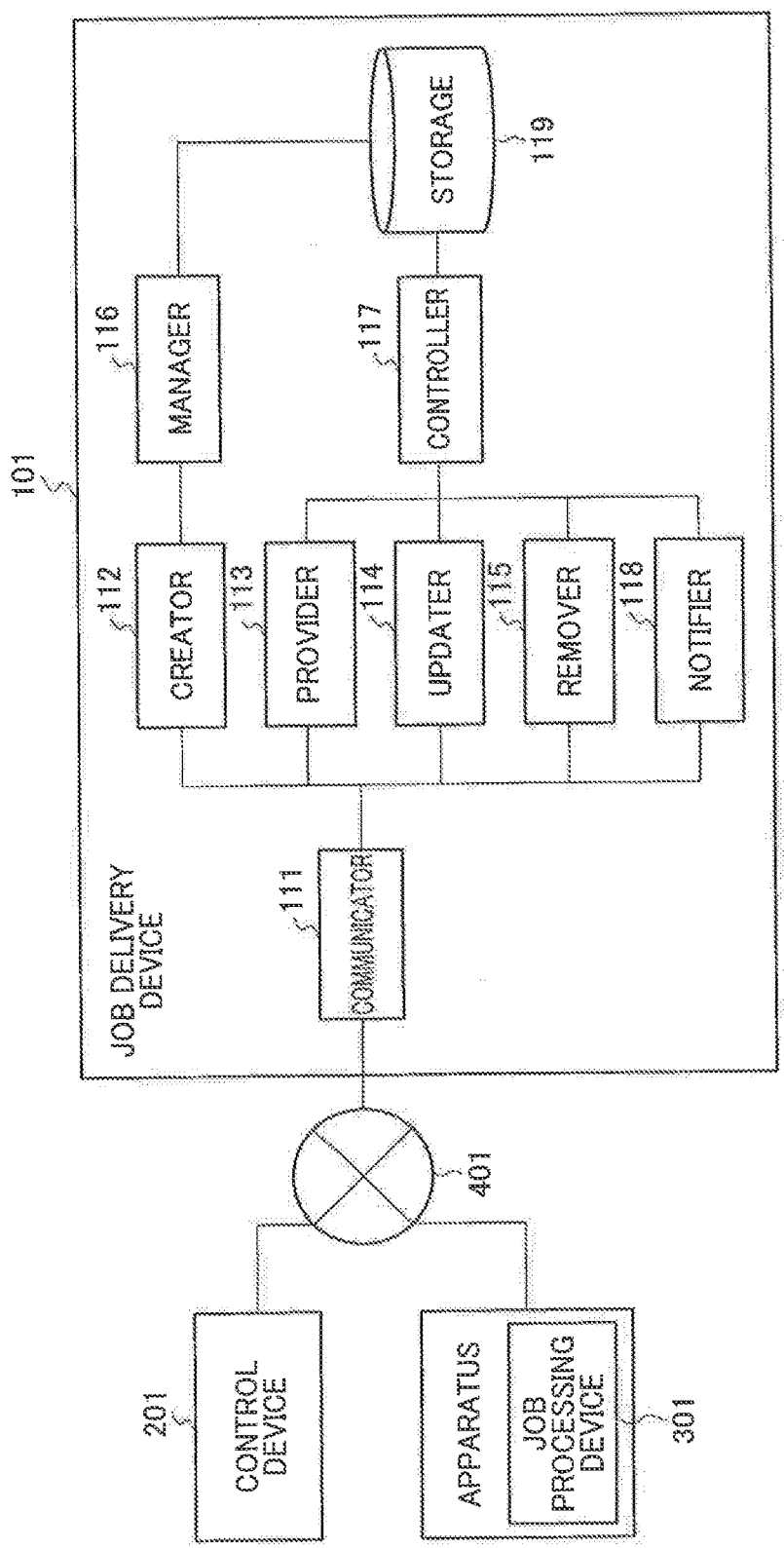
FIG. 1 is a configuration diagram of a communication system according to an embodiment of the present invention.

FIG. 1 is a configuration diagram of a communication system according to the embodiment of the present invention. The communication system includes a job delivery device 101 that is a communication device according to the embodiment, a control device 201, and a job processing device 301 (processing device). The job delivery device 101, the control device 201 and the job processing device 301 are connected through a network 401.

The control device 201 issues a request (job creation request) with the designation of the content of a process that is executed by the job processing device 301. The control device 201 is typically mounted on a portable terminal such as a smartphone or a tablet. The operation relevant to the issue of the job creation request by the control device 201 is implemented by an application that operates on the device. The application may operate in response to an instruction from a user of the device. The instruction from the user is input through an input interface included in the device, as exemplified by a touch panel, a keyboard and a mouse.

The job delivery device 101 receives the job creation request from the control device 201, and creates a job containing the information (execution instruction information) that instructs the job processing device 301 to execute the process and a time limit (an execution time lime for the process, or the like). The job delivery device 101 manages the created job in a list or a database. The job delivery device 101 manages a plurality of states of the job and the transition among the states, based on a predetermined state transition diagram. The job delivery device 101 controls the execution of a request received from the control device 201 or the job processing device 301, based on the time limit and the state of the job. For example, the types of requests that can be accepted from the control device 201 or the job processing device 301 are determined according to the state of the job. When the job is in a certain state, the job delivery device 101 accepts a specific request, executes it, and thereby, makes the transition of the state of the job. Further, in some cases, the state transitions because of the exceeding of the time limit. The detail of the job delivery device 101 will be described later.

The job processing device 301 acquires the job from the job delivery device 201, and performs the instructed operation in accordance with the execution instruction information contained in the job. The job processing device 301 is typically mounted on hardware apparatuses or digital apparatuses such as televisions, white goods, household facilities, plant facilities, resource-saving devices such as sensors and actuators, and the like. Here, the job processing device 301 may be connected with the apparatus through a network, without being incorporated in the apparatus.

The network 401 implements the communication between the control device 201 and the job delivery device 101, and allows for the communication between the job delivery device 101 and the job processing device 301. For example, it is assumed that the control device 201 is connected with a portable telephone network (3G, LTE®, WiMAX® or the like), the job delivery device 101 is connected with an intranet in a cloud service, and the job processing device 301 is connected with a local home network (Ethernet®, Wi-Fi® or the like). In this case, the network 401 is composed of these portable telephone network, intranet and local network, and a wide area network (internet) connected with them. Thereby, the job delivery device 101, the control device 201 and the job processing device 301 can communicate with each other through the network 401. In this way, the network 401 is composed of a plurality of types of networks. Actually, on the network 401, there can be broadband routers, and gateway devices to connect the networks, but the illustration of them is omitted.

The above-described network configuration is just an example. Similarly to the job processing device 301, the control device 201 may be connected with a home network. The job processing device 301 may be provided with a 3G communication module, and may be directly connected with the internet through a portable telephone network. The job delivery device 101 may be provided on a public cloud. There can be a configuration in which the three devices (the job delivery device 101, the control device 201 and the job processing device 301) are disposed on a single closed network.

The job delivery device 101 is composed of a general computer (a CPU, a memory, a storage and the like). The job delivery device 101 may be a server device whose function is implemented in server software. The function of the job delivery device 101 may be implemented in the software that operates on a virtual machine. The job delivery device 101 is typically a Web server using HTTP (Hypertext Transfer Protocol). However, as the communication protocol, any protocol, including CoAP (Constrained Application Protocol), may be adopted, if it can implement an equivalent function.

The job delivery device 101 includes a communicator 111, a creator 112, a provider 113, an updater 114, a remover 115, a manager 116, a controller 117, a notifier 118, and a storage 119. The elements 111 to 118 may be implemented in arbitrary processing circuitry such as processors including CPUs, or dedicated circuits. The processing circuitry may be on an integrated circuit. The processing circuitry implementing the elements 111 to 118 may be configured by circuits that are physically different from each other, or some of them may be on a physically identical circuit.

The communicator 111 includes a communication interface for the communication with the network 401, a communication protocol processing layer for an OS (Operating System), and a communication protocol processing layer for implementing the communication concerning the job delivery. The communication interface performs processes for the data link layer and the physical layer in accordance with the type of the destination network 401. If the destination network 401 is a wireless LAN, the communication interface performs processes for the MAC layer and physical layer of the wireless LAN. Examples of the communication protocol processing layer for the OS include TCP/IP and UDP/IP. Examples of the communication protocol processing layer concerning the job delivery include HTTP and HTTPS.

As an example, a single network board may be equipped with all functions of the communicator 111. Alternatively, the communication interface may be implemented on a network board, and the communication protocol processing layers concerning the OS and the job delivery may be implemented by the operation of a CPU that is connected with a bus and the like. Alternatively, the communication interface and the communication protocol processing layer for the OS may be implemented on a network board, and the communication protocol processing layer concerning the job delivery may be implemented by the operation of a CPU that is connected with a bus and the like.

The communicator 111 receives the job creation request from the control device 201 through the network 401. The job creation request contains control demand information that is necessary for the creation of the job. FIG. 2(A) and FIG. 2(B) show examples of the job creation request. FIG. 2(A) shows an instruction to turn on a power source (or power supply) of an apparatus (here, a television is assumed), as the content of the process to be executed by the job processing device 301.

As another example of the job creation request, FIG. 2(B) shows an example in which there is contained time limit information such as a job execution time limit (hereinafter, referred to as an execution time limit) and a job-processing-result viewing time limit (hereinafter, referred to as a viewing time limit). An attribute "requestExpiredIn" indicates an execution time limit of the job. The attribute "responseExpiredIn" indicates a time limit until which an execution status such as the processing result of the job can be referred to after the registration in the apparatus (that is, a time limit until which the information indicating an execution status such as the processing result can be provided). The first line in FIG. 2(B) is the same as the FIG. 2(A). The second line indicates that the job is invalidated if the job is not processed within 1 hour (3600 seconds) by the job processing device 301. Further, the third line indicates that the processing result of the job by the job processing device 301 is kept in the referable state for 10 hours (36000 seconds) after the completion of the processing, and is invalidated when 10 hours have elapsed. The invalidation includes at least one of a case where the job itself is removed and a case where the information about the job is internally held and is externally hidden.

In the case of an HTTP protocol, the request line in a job creation request message is described as "POST /v1/devices/:device_id/jobs", for example. ":device_id" is the identification information (ID) of the job processing device 301. Here, the example of the request line is just an example according to the REST notation, and the description is not limited to this. Further, on the body line in the message, the control demand information having the description shown in FIG. 2(A) or FIG. 2(B) is set.

The creator 112 receives the job creation request (see FIG. 2) through the communicator 111, and creates the job containing the following items, based on the job creation request.

(1) The ID of the job
(2) The ID of the job processing device 301 by which the job is executed
(3) The ID of the control device 201 that is the requester
(4) The content of the process that is executed by the job processing device 301
(5) The time stamp of the time when the job was created
(6) The time limit information (the execution time limit, the viewing time limit and the like)

As an example, the set of (2), (3) and (4) corresponds to the information (execution instruction information) that instructs the job processing device 301 to execute the process. The execution instruction information may contain another item, for example, at least one of (1), (5) and (6), or an item that is not listed here.

The creator 112, after creating the job, sends a job creation response to the control device 201. The job creation response contains the whole or a part of the information about the created job. FIG. 3 shows an example of the job creation response.

"id" is the job ID. "requesterId" is the ID of the control device 201 (requester), that is, the user ID. "responderId" is the ID of the job processing device 301. "request" is the content of the process that is executed by the job processing device 301. "requestExpiredIn" is the execution time limit of the job. "responseExpiredIn" is the viewing time limit. "createdAt" is the time stamp of the time when the job was created.

In the illustrated example, the job ID is "123456789000", the ID of the control device 201 is "alice", and the ID of the job processing device 301 is "0724517763699939". The content of the requested process is to turn on the power source of the apparatus ("power": "on"). The execution time limit is 1 hour (3600 seconds). The viewing time limit is 1 hour (3600 seconds). The time stamp (createdAt) of the time of the job creation is "2015-01-01T00:00:00". The starting point of the execution time limit is the time stamp, as an example. The starting point of the viewing time limit is assumed to be the time when the execution of the job is completed (described later), but the starting point of the viewing time limit may be the time stamp (createdAt).

The example of the job creation response in FIG. 3 is just an example. Some items may be absent, or another item may be contained. For example, the execution time of the job or the time range of the job execution may be designated, instead of the execution time limit. Alternatively, immediate execution may be designated. The designation of the execution time means that the process is executed at that time. The designation of the time range means that the process is executed at an arbitrary time in the range. The immediate execution means that the created job is immediately executed (immediately sent to the job processing device 301). In this case, it is necessary to set the connection such that a push notification can be performed between the job processing device 301 and the job delivery device 101, as described later. The case where the execution time limit is 0 (null) may be handled as the immediate execution.

In the case where the job creation request contains a request value of the time limit (the execution time limit, the viewing time limit or the like), the creator 112 determines the time limit based on the request value. As an example, the value requested in the job creation request, with no change, is used as the time limit. However, in the case where the value of the time limit designated in the job creation request exceeds an upper limit value determined in advance or falls below a lower limit value, the upper limit value or the lower limit value may be set as the time limit.

For example, when the upper time limit of the viewing time limit is 1 hour and the request value of the viewing time limit requested in the job creation request is 10 hours, 10 hours is reduced to 1 hour, and this is set as the viewing time limit. In the example shown in FIG. 3, the viewing time limit is set to 1 hour.

In the case where the job creation request does not contain the time limit, a default value may be set as the time limit. For example, the upper limit value or lower limit value of the time limit may be set. Alternatively, the median value between the upper limit value and the lower limit value may be set. Here, the upper limit value and lower limit value of the time limit (or the default value of the time limit) may be different depending on the type of the process. That is, the value of the time limit may be changed depending on the type of the process. For example, in the case of a process to request the erasing of recorded video data in the TV, the execution time limit is set to a long time such as 24 hours, and in the case of an instruction to request a channel switching, the execution time limit is set to a short time such as 30 seconds, for example.

Here, "alice", which is the ID of the control device 201, may be extracted and used from the job creation request, in the case where this is contained in the job creation request. Alternatively, "alice" may be specified by the job delivery device 101, based on the address of the transmission source of the job creation request message. In this case, the job delivery device has the associated data in which the address and ID of the control device 201 are associated. Further, the time stamp (createdAt) may be acquired from a clock that is included in the interior of the device, or may be acquired from a time server through the network 401. As the time stamp, for example, the time when the job is actually created, the time when the job creation request is received, or other times may be used.

The creator 112 registers the created job in a database of the storage 119. The storage 119 may be a memory such as a DRAM, a SRAM, a NAND, a MRAM and a FRAM, or may be a hardware storage device such as a hard disk and a SSD. The storage 119 may be incorporated in the device, or may be externally attached. Further, the storage 119 may be a server that is connected with the device through an arbitrary network 401. FIG. 4 show an example of the database. One line (row) corresponds to one job. Values do not need to be initially placed in all cells on one line, and values are added in accordance with the processing stage. For example, the first line corresponds to the case of FIG. 2(B). At the time point of the creation of the job, the job ID, the user ID, the job processing device ID, the process content, the job state, the execution time limit, the viewing time limit and the job creation time are set. The other cells are blank at this time point (FIG. 4 show the case where the cells are blank). As described later, the job state is set to a creation state ("created"), at this time point (see FIG. 6 described later). The jobs in the database, for example, are arrayed in an order in which the jobs are created.

The job creation response to be sent to the job processing device 301 may contain the whole of the created job, or may contain only a part of the information about the job. For example, only the job ID and the time limit information may be contained.

The control device 201 after receiving the job creation response from the job delivery device 101 confirms the content of the job, and thereby, can confirm that the job creation request has been normally processed by the job delivery device 101 and the job has been registered. Further, in the case of designating the execution time limit, the viewing time limit and the like, the control device 201 can also confirm, for example, whether these time limits have been altered by the job delivery device 101. The control device 201 may display the information to be sent and received for the job delivery device, on a screen, such that the user of the device confirms the information. By the input of an instruction, the user can appropriately make the control device 201 perform a desired operation.

In the examples of FIG. 2 and FIG. 3, the time limit is expressed by a relative time period (seconds), but there can be a variation in which the time limit is expressed by an absolute value such as time. For example, the time limit may be expressed as "from AA:BB:CC on Y-month, X-date, 20XX-year to DD:EE:FF on Y-month, X-date, 20XX-year".

Figure 5:
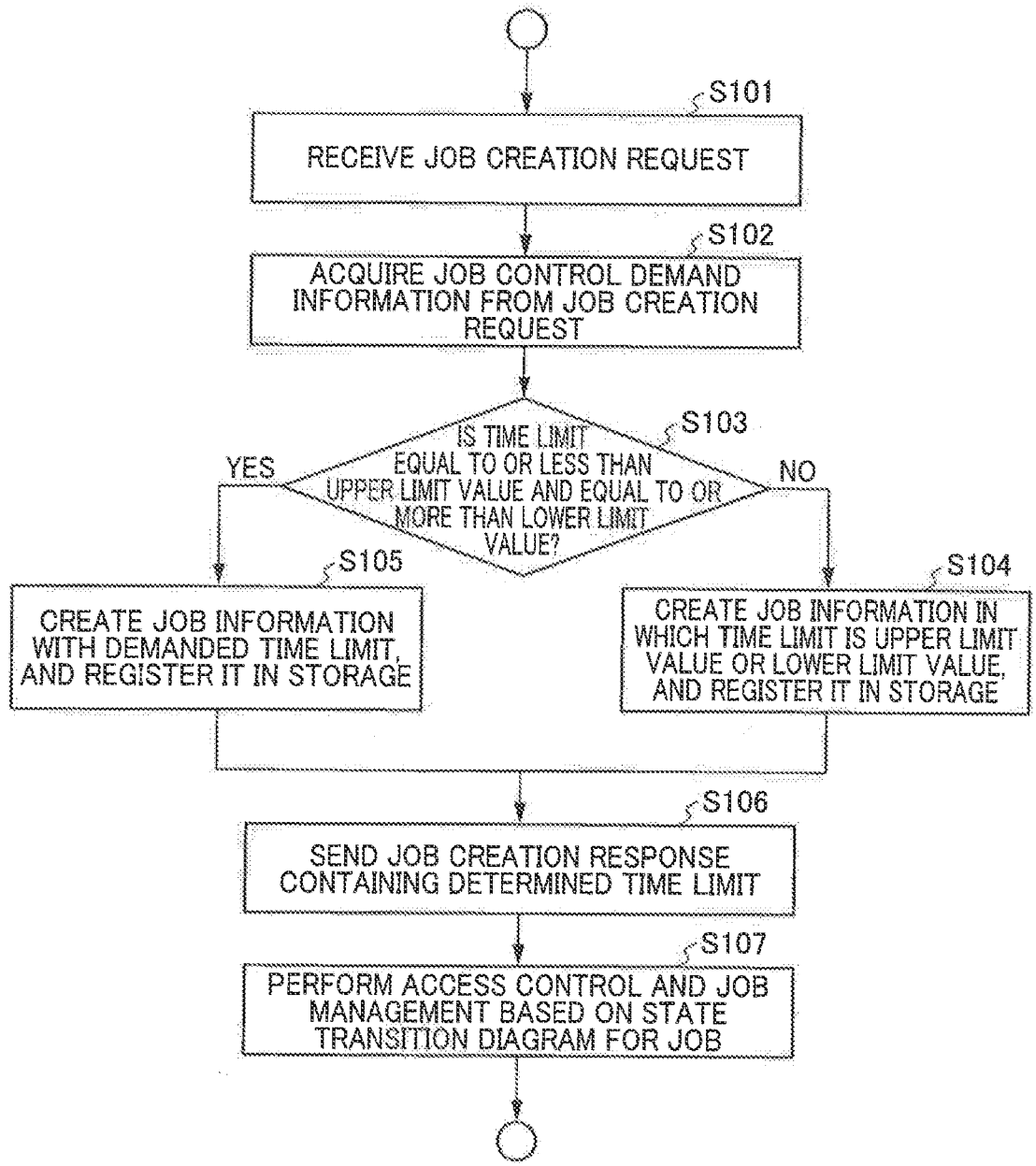
FIG. 5 is a diagram showing a flowchart of an operation when a job delivery device receives the job creation request.

FIG. 5 shows a flowchart of an operation when the job delivery device 101 receives the job creation request. Here, an example of the case where the time limit (the execution time limit, the viewing time limit or the like) is designated in the job creation request is shown.

The creator 112 receives the job creation request from the control device 201 through the communicator 111 (S101), and then, acquires the control demand information from the job creation request (S102). Examples of the job control demand information include the content of the process that is executed by the job processing device 301 (a process to turn the TV on, or the like), and the time limit (the execution time limit, the viewing time limit or the like).

Whether the demanded time limit is equal to or less than the upper limit value and equal to or more than the lower limit value is judged (S103). In the case where the demanded time limit is equal to or less than the upper limit value and equal to or more than the lower limit value, the value of the demanded time limit is employed as the time limit (the execution time limit, the viewing time limit or the like). A job in which the employed value is set as the time limit is created (S105). The creator 112 registers the created job in the database of the storage 119.

On the other hand, in the case where the demanded time limit is more than the upper limit value or in the case where the demanded time limit is less than the lower limit value, the time limit is determined to be the upper limit value or the lower limit value. A job in which the time limit is set is created (S104). The creator 112 registers the created job in the database of the storage 119.

The creator 112 sends the job creation response containing the whole or a part of the information about the created job, to the control device 201 through the communicator 111 (S106).

Thereafter, the job delivery device 101 performs the control and management of the job, using the provider 113, the manager 116, the controller 117, the updater 114, the remover 115 and the notifier 118 (S107). In the following, details of the provider 113, the manager 116, the controller 117, the updater 114, the remover 115 and the notifier 118 will be described.

Figure 6:
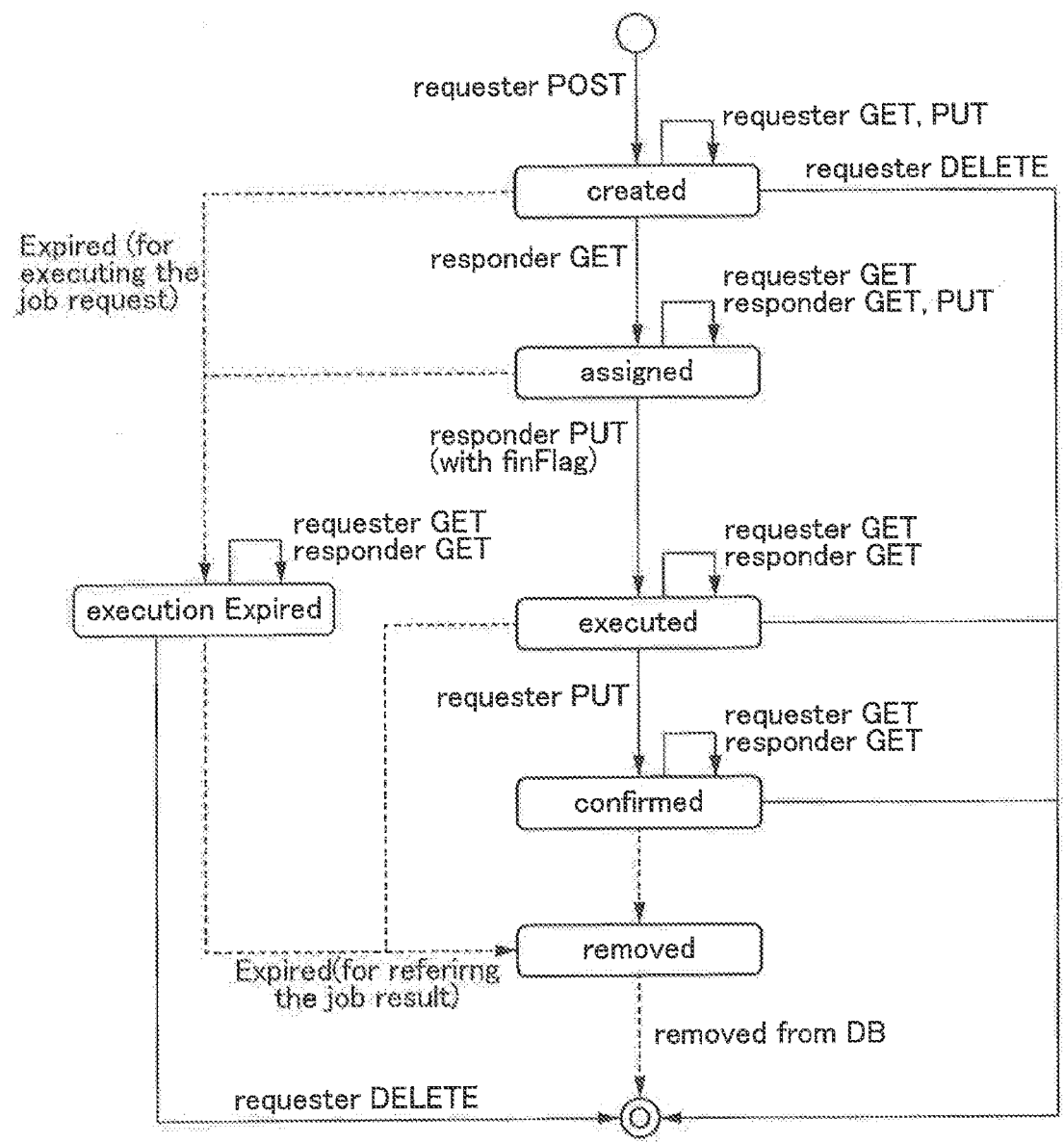
FIG. 6 is a diagram showing an example of a state transition diagram.

FIG. 6 shows a state transition diagram for the job. Based on the state transition diagram, the controller 117 controls a plurality of states of the job and the transition among the states. In each state, the controller 117 controls the execution of the request from the control device 201 or the job processing device 301.

The state transition diagram in FIG. 6 contains a plurality of states of the job and a plurality of state transitions. As the state of the job, a created state "created", an assigned state "assigned", an executed state "executed", an inspected state "confirmed", an execution-time-limit expiration state "executionExpired" and a removed state "removed" are defined. When the creator 112 creates the job, the controller 117 sets "created" as the state of the job.

In each state, the request that can be accepted from the control device 201 or the job processing device 301 is restricted (exclusive control). The transition from a certain state to another state is performed when a corresponding request is executed in the certain state. Further, in some cases, the state transitions because of the exceeding of a predetermined time limit (the execution time limit, the viewing time limit or the like) in a certain state.

In accordance with the state transition diagram shown in FIG. 6, the controller 117 controls the transition of the job state, in cooperation with the provider 113, the updater 114, the remover 115 and the notifier 118.

In the figure, "requester" indicates the control device 201, and "responder" indicates the job processing device 301. "GET" indicates an acquisition request, "PUT" indicates an update request, and "DELETE" indicates a removal request. The solid lines connecting among the states in the figure indicate state transitions that are performed when requests from the control device 201 and the job processing device 301 are executed. The broken lines indicate state transitions that are performed in the case of the exceeding of the time limit or in the case of the elapse of a certain time.

In the case of receiving a request from the control device 201 or the job processing device 301, the provider 113, the updater 114 and the remover 115 judge whether the request can be executed through the controller 117. The controller 117 judges whether the request can be executed, based on the state of the corresponding job. In the case where the request can be executed, the provider 113, the updater 114 and the remover 115 are controlled to execute the request. In the case where the request cannot be executed, an error response is sent. In the case of the HTTP protocol, examples of the error response include "409 (Conflict)" and "405 (Method Not Allowed)". The provider 113 processes the acquisition request, the updater 114 processes the update request, and the remover 115 processes the removal request.

When the job state is "created", "assigned", "executed", "confirmed" or "executionExpired", the provider 113 can accept the job acquisition request containing the job ID, from the control device 201. Further, when the job state is "assigned", "executed", "confirmed" or "executionExpired", the provider 113 can accept the job acquisition request containing the job ID, from the job processing device 301. Here, as for a job having the job state "executionExpired", an implementation mode in which the response to the job acquisition request does not contain the information about the job may be adopted, similarly to the state "removed".

Responding to the job acquisition request containing the job ID, the provider 113 acquires the job from the storage 119, and sends a response (job acquisition response) containing the acquired job. In the case of HTTP, the request line in the job acquisition request to be sent from the control device 201 is "GET/v1/devices/:device_id/jobs/:job_id", for example. The request line in the job acquisition request to be sent from the job processing device 301 is "GET/v1/self/jobs/:job_id", for example. Here, the job to be contained in the job acquisition response may be the whole of the information about the job, or may be a part of the information. Further, the content of the information to be contained in the job acquisition response may vary depending on the state when the job acquisition request is executed.

Further, the provider 113 can accept a job acquisition request in which the designation of a specific job ID is not contained (referred to as a job list acquisition request). The job list acquisition request may contain a range (an acquisition start index and the number of jobs), may contain a filtering condition, or may contain both of them. As the filtering condition, for example, the range of the job ID, the device ID or the like may be designated. Alternatively, the provider 113 may implicitly perform the response with all jobs for the control device 201 or the job processing device 301. Further, it is allowed to request the response of only the jobs that the job processing device 301 has not acquired yet. In the case where the maximum response number is set, the job list acquisition request may be sent a plurality of times, and the response (job list acquisition response) may be received in a plurality of steps.

In the case of HTTP, the request line in the job list acquisition request to be sent by the control device 201 is "GET /v1/devices/:device_id/jobs", for example. The request line in the job list acquisition request to be sent by the job processing device 301 is "GET/v1/self/jobs", for example.

It is allowed to set one of the ID of the job processing device 301, the ID of the control device 201 and the ID of the user of the control device 201, on the request line in the job acquisition request or the job list acquisition request. They may be set as parameters on the request line. Alternatively, the ID may be added on the header line, instead of the request line.

The job information to be contained in the job list acquisition response may be different from the job information to be contained in the job acquisition response in the case where the job ID is designated. For example, in the case of the job list acquisition response, a summary of the information about the job (that is, a part of the information to be contained in the job) may be contained. The summarized information, for example, may be the information containing only the job ID, or may be the information containing only the job ID and the job state. In addition, the summarized information may be the information containing only the job ID, the time stamp and the time limit information. FIG. 7 shows an example of the information in this case. The respective summarized information about two jobs is contained.

As the case where the job created by the job delivery device 101 is acquired by the job processing device 301 for the first time, there is a case where the job list acquisition request is received from the job processing device 301. In the case of requesting only the jobs that the job processing device 301 has not acquired yet, it is only necessary to send a job list acquisition request in which that effect is designated. As another method, there can be a method in which the provider 113 notifies the job to the job processing device 301 at the time point when the creator 112 creates the job (push notification). In this case, the notifier 118 establishes, in advance, the connection for notification with the job processing device 301. As described later, the notifier 118 can perform the push notification by establishing and keeping the connection for notification with the job processing device 301, the control device 201 or both of them. The detail of the notifier 118 will be described later.

For the job that is provided to the job processing device 301 for the first time, the provider 113 alters the state from "created" to "assigned" through the controller 117, when providing the job. As shown in FIG. 6, in the case of receiving the acquisition request (responder GET) from the job processing device 301 (responder) and executing it when the state is "created", the controller 117 makes the state of the job transition to "assigned".

The provider 113 or the controller 117 sets, in the job, the time stamp of the time when the state of the job is altered to "assigned", that is, the time when the job is assigned to the job processing device 301. Specifically, as shown in FIG. 4B, the job in the database is updated. The state of the job is altered to "assigned". Further, the time stamp of the assignment time is added. The response with the job in which the time stamp is set is performed to the job processing device 301. FIG. 8 shows an example of the job acquisition response. The time stamp ("assignedAt") is added to the information in FIG. 3.

Here, there can be also a configuration in which the job is assigned responding to the job list acquisition request. In this case, similarly to the job acquisition request in which the job ID is designated, the state may be altered from "created" to "assigned", and therewith the time stamp ("assignedAt") may be set. The job list acquisition response may contain the time stamp ("assignedAt").

As shown in FIG. 6, when the job state is "assigned", the acquisition request (requester GET) can be accepted from the control device 201. Further, the acquisition request (responder GET) and the update request (responder PUT) can be accepted from the job processing device 301, and can be executed.

The updater 114 updates the state of the corresponding job to "executed" through the controller 117, in the case of receiving a job update request (responder PUT) containing the job ID (a processing result registration request described later) from the job processing device 301 when the state is "assigned". Further, the updater updates the state of the corresponding job to "confirmed" after the inspection (which may be called acceptance inspection), in the case of receiving a job update request (requester PUT) containing the job ID (an inspection request described later) from the control device 201 when the state is "executed".

Here, the request line in the job update request to be sent by the job processing device 301 is "PATCH /v1/self/jobs/:job_id", for example. The request line in the job update request to be sent by the control device 201 is "PATCH /v1/devices/:device_id/jobs/:job_id", for example. This is an example according to the REST notation as described above, and another method "PUT", "POST" or the like may be used and substituted. The specific content of the update may be set as a parameter on the request line, may be set on the body line in the message, or may be set on both of them.

The updater 114 executes the processing result registration request, in the case of receiving the processing result registration request as the job update request from the job processing device 301 when the state is "assigned".

FIG. 9 shows an example of the processing result registration request. An attribute "response" indicates that the execution status ("status") of the process is "done", which means that the process has been executed (or that the execution has been started). An attribute "finished" is a completion attribute, and indicates whether the process of the job has been completed. "true" indicates that the process of the job has been completed. The case of "false" indicates that the process of the job has not been completed yet. For example, in the case of the dubbing of DVD data, it is possible to express that the dubbing has been started but has not been completed. It is allowed to add, in the attribute "response", the information indicating a percentage to which the whole process for the dubbing has been completed. In the example shown in FIG. 6, the state transitions to "executed" are shown, only in the case where the attribute "finished" is "true".

Here, there can be a configuration in which the attribute "finished" is not provided. In this case, when the process of the job has been started but the process of the job has not been completed, it is only necessary to set "status" to "undone". In this case, the updater 114 may keep "assigned" as the state of the job. On this occasion, it is allowed to add, in the attribute "response", the additional information about a percent to which the process has been completed. As another implementation mode, the attribute "status" may be provided as an attribute in the same hierarchy as the attribute "response" of the job information in the processing result registration request, and this may be set to "executed". In the case where the processing result registration request is sent, the process of the job may be regarded as being completed (in this case, "done" may be set if the execution has been started). In the case where nothing is added, "assigned" may be kept as the state of the job.

By the execution of the processing result registration request, the updater 114 updates the corresponding job in the database of the storage 119. Specifically, the updater 114 updates the corresponding job in the database as shown in FIG. 4C.

The state of the job is altered to "executed". Further, the information ("done" for the attribute "response" and "true" for the attribute "finished") contained in the processing result registration request is added. The time stamp of the execution time (completion time) of the job is added. In the case where the attribute "finished" is "true", the time stamp (attribute "executedAt") is placed. In the case of "false" (in the case where the process has not been completed), the time stamp does not need to be placed, and another time such as start time and estimated completion time may be placed.

Further, whenever reaching a certain level, for example, 10%, 20% and the like, the processing result registration request may be sent by the job processing device 301, and the current stage of the process execution may be reflected in the job. In this case, as "status", values indicating levels of the process may be provided, in addition to "done" and "undone", and a value corresponding to the level may be set in the column of "execution status".

As the execution time, for example, the time when the updater 114 receives the processing result registration request in which the attribute "finished" is "true" may be used. Alternatively, the time may be contained in the processing result registration request, and this may be used.

Further, the confirmation code is set. The confirmation code is used by the control device 201, for the inspection of the job. The updater 114 creates the confirmation code. As the creation method for the confirmation code, for example, there is a method of calculating a hash value of a single or a plurality of item values contained in the job. In the case where a part of the job is updated after the issue of the confirmation code, the confirmation code is also updated each time. As a specific example of the confirmation code, a hash value or the like of the value ("done" or the like) of the attribute "response" may be used, or a mere random number created so as to be different from the confirmation number of the previous state may be used. The confirmation code is used when the control device 201 inspects the job, for confirming that the job as the inspection object is not updated. In the example of FIG. 4C, the value of the confirmation code is "xd1a3fap5i6f".

After the execution of the processing result registration request, the updater 114 sends a response (processing result registration response) containing the job, to the job processing device 301. FIG. 10 shows an example of the processing result registration response. The content updated in FIG. 4C is added. That is, the information ("done" for the attribute "response" and "true" for the attribute "finished") contained in the processing result registration request is added. Further, an attribute "executedAt" and an attribute "confirmationCode" are added. The attribute "executedAt" indicates the time stamp of the execution time (completion time) of the job. The attribute "confirmationCode" indicates the confirmation code. As another implementation mode of the confirmation code, the provider 113 may set the confirmation code in Etag of the response header in HTTP, and may transmit it to the control device 201 and the job processing device 301. Meanwhile, the control device 201 and the job processing device 301 may set the confirmation code in If-Match of the request header in HTTP, and may transmit it to the updater 114 or the remover 115.

In the case where the job acquisition request or the job list acquisition request is received from the control device 201 after the processing result registration response in FIG. 10 is sent to the job processing device 301, a response containing the job in which the confirmation code is set is sent (unless the job is excluded by a filtering condition). The response is the job acquisition response or the job list acquisition response.

The updater 114 receives a job processing result inspection request (hereinafter, referred to as an inspection request), as a job update request, from the control device 201. In the case of succeeding in the inspection, the updater 114 updates the job state in the database from "executed" to an inspected state ("confirmed"), through the controller 117. Further, the inspection time is set. FIG. 4D shows the state of the database at this time.

FIG. 11 shows an example of the inspection request. The inspection request contains the confirmation code of the job that is the inspection object. In the case of HTTP, the confirmation code is set on the body line in the message. Alternatively, the confirmation code may be set as a parameter on the request line.

The updater 114 checks whether the confirmation code contained in the inspection request matches the confirmation code contained in the corresponding job. In the case of the matching, the check is successful, and therefore, the state of the job is updated from "executed" to the inspected state ("confirmed"), through the controller 117. Further, the updater 114 or the controller 117 sets, in the job, the time stamp (attribute "confirmedAt") of the inspection time (that is, updates the job in the database). After the state of the job is updated to "confirmed", the controller 117 controls such that an inspection response containing the updated job is sent to the control device 201. FIG. 12 shows an example of the inspection response. The time stamp (attribute "confirmedAt") of the inspection time is newly added, compared to the processing result registration response in FIG. 10. Here, in the case where the check is unsuccessful, the updater 114 returns an error response indicating that effect.

Meanwhile, the control device 201 acquires the job by sending the job acquisition request or the like to the job delivery device 101, and gains the confirmation code (the value of the attribute "confirmationCode") contained in the acquired job. The inspection request containing the confirmation code is sent to the job delivery device 101.

The updater 114 checks whether the confirmation code contained in the inspection request matches the confirmation code contained in the job that is the inspection object, as described above, and in the case of the matching, judges that the job is not updated after the job is sent to the control device 201 (that is, the inspection is successful). In this case, the state of the job is updated from "executed" to the inspected state ("confirmed").

The controller 117 may remove the job from the database, after a certain time from the transition to "confirmed". In FIG. 6, this state is expressed as "removed". The job may be absolutely removed from the database, or the removal may be expressed by registering "removed" in the database. The job with "removed" may be handled as an object that can be erased at any time after that. By setting "removed", it is possible to record a history of removed jobs. In the case where the space in the database is insufficient, the job with "removed" may be erased. The job with "removed" cannot be recognized by the control device 201 or the job processing device 301. That is, even when the job acquisition request or the like is received, the response is not performed for the job with "removed".

Here, the updater 114 can also accept the update request from the control device 201, when the job state is "created" (see FIG. 6). For example, in the case of altering the execution time limit, or in the case of altering the content of the process that is executed by the job processing device 301, the control device 201 sends the update request having the instruction of that effect. Based on the update request, the updater 114 updates the corresponding job.

The remover 115 receives a job removal request containing the job ID, from the control device 201, and removes the corresponding job from the database. In the case of the HTTP protocol, the request line in the message of the job removal request is described as "DELETE /v1/devices/:device_id/jobs/:job_id", for example. As shown in FIG. 6, the job removal request can be accepted when the state is "created", "executed" or "confirmed". When the state is "executed", the job removal request may be rejected. Here, as another implementation mode, when receiving the job acquisition request or the job list acquisition request (containing the attribute "response" of the job in the response) from the control device 201, the provider 113 may make the response contain the job having the "executed" state, and therewith, may remove the job (through the remover 115). On this occasion, whether the job is removed simultaneously with the acquisition may be designated as a parameter in the job acquisition request, may be designated as a removal scheme for the job having the "executed" state at the time point of the job creation request, or may be previously set as an operation attribute of the job delivery device 101.

For the job created by the creator 112, the manager 116 manages various time limits that are set in the job. As shown in FIG. 6, in the case of detecting the exceeding of the execution time limit through the manager 116 when the state is "created" or "assigned", the controller 117 makes the state of the job transition to "executionExpired".

When the state is "executionExpired", the job acquisition request may be accepted from the control device 201 or the job processing device 301. On this occasion, through the manager 116, the provider 113 adds the information indicating that the job is invalid, in the response to be returned to the control device 201 or the job processing device 301. Thereby, it is possible to prevent the job processing device 301 from executing the process. Alternatively, the response contains the execution time limit, and the job processing device 301 detects the exceeding of the execution time limit. Thereby, the execution of the process may be prevented. In this case, it can be said that the response containing the expired execution time limit contains the information indicating that the job is invalid. As another implementation mode, the job acquisition request may be originally rejected in the case of "executionExpired" (for example, "404 Not Found" or the like in HTTP is returned). On this occasion, in order to avoid the response for the expired job, whenever the provider 113 receives the job acquisition request and provides the corresponding job, the provider 113 may confirm the execution time limit and the viewing time limit (through the manager 116), and may make the state of the corresponding job transition to "removed" in the case of the exceeding of the time limit.

Further, in the case where the manager 116 detects the exceeding of the viewing time limit when the state is "executionExpired" or "executed", the manager 116 makes the state of the job transition to "removed" through the controller 117. Then, the manager 116 or the controller 117 removes the job after the transition to "removed", from the database of the storage 119. Here, also in the case where the remover 115 receives the removal request from the control device 201 when the state is "executionExpired", the remover 115 removes the job from the database of the storage 119, through the controller 117 (see FIG. 6).

As the method for removing the job, similarly to the above description, the job itself may be absolutely removed from the database, or the removal may be expressed by setting "removed" in the database.

The characteristics of the above states of the job are simply described as follows. "created" is a state allowing for the update or removal of the job mainly from the control device 201. "assigned" is a state where the exclusive control right (authority) is given mainly to the job processing device 301. "executed" is a state where the exclusive control right for the inspection or the removal is given only to the control device 201. "confirmed" Is a state where the update of the processing result from both of the control device 201 and the job processing device 301 is blocked and where the control device 201 has confirmed the final result.

The notifier 118 sets the connection of notification with a client (the control device 201 and the job processing device 301), and autonomously performs notification to the control device 201 or the job processing device 301 in the case where the creation, update or the like of the job occurs. Specifically, when the creator 112 creates the job, the notifier 118 notifies the creation of the job to the job processing device 301 (for example, the same content as the job acquisition response is contained). The update of the job performed responding to the update request from the job processing device 301 is notified to the control device 201. Alternatively, the update of the job performed responding to the update request from the control device 201 is notified to the job processing device 301. The notification (push notification or asynchronous notification) is autonomously performed, without receiving the acquisition request from the job processing device 301 or the control device 201. Thereby, it is possible to timely notify the state change. Here, the notifier 118 is not essential, and there can be a configuration in which the notifier 118 is not included. In this case, it is only necessary to execute a sequence of receiving a request and returning a response, similarly to the above description.

For the establishment of the connection, a communication protocol for implementing the asynchronous notification, as exemplified by WebSocket and HTTP Comet, may be used. Other than this, a Pub/Sub protocol such as MQTT may be used.

As a specific operation example for implementing such an asynchronous notification, the notifier 118 receives an establishment request of the connection for notification from clients (the control device 201 and the job processing device 301), and establishes the connection with each of the clients. The notifier 118 may directly receive the establishment request of the connection for notification from the clients, to establish the connection.

Further, there is also a connection establishment method in which the notifier 118 once receives an establishment request (an HTTP request or the like) of the connection for notification and performs a response with a destination URL to the client, and the client establishes the connection again. Further, there can be a method in which the destination URL is merged into the job creation response or the job acquisition response. FIG. 13 shows an example of the merging of the destination URL into the job creation response. The destination URL is contained as the value of an attribute "subscriptionUrl". In the case where the destination URL is merged, it is not necessary to perform the establishment request of the connection for notification from the client.

Thus, the notifier 118 has a function of a message relay server based on the WebSocket protocol. Further, the notifier 118 has also a function of a Web API server that outputs the destination URL.

Figure 14:
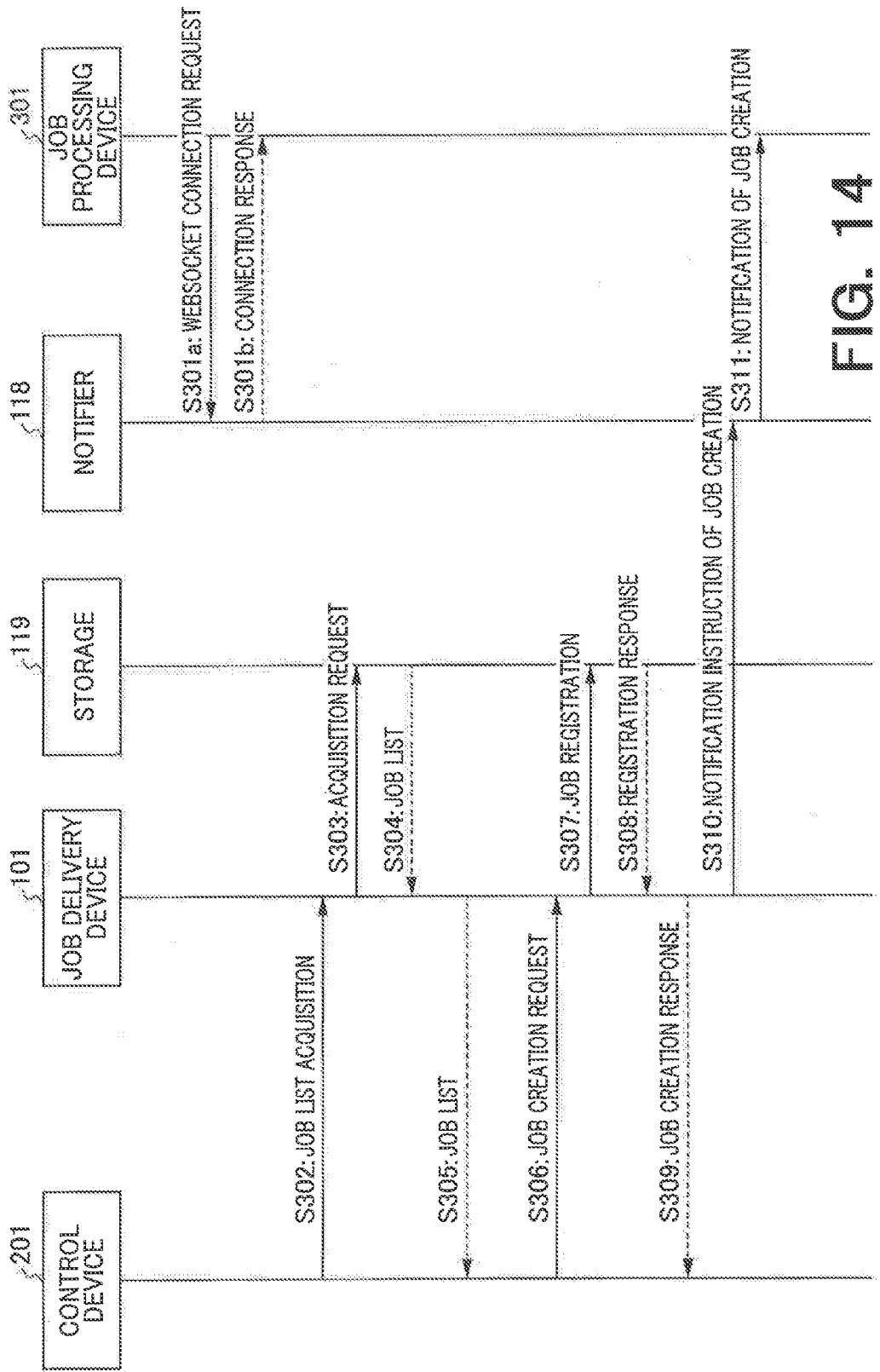
FIG. 14 is a diagram showing an example of a specific sequence according to the embodiment.
Figure 15:
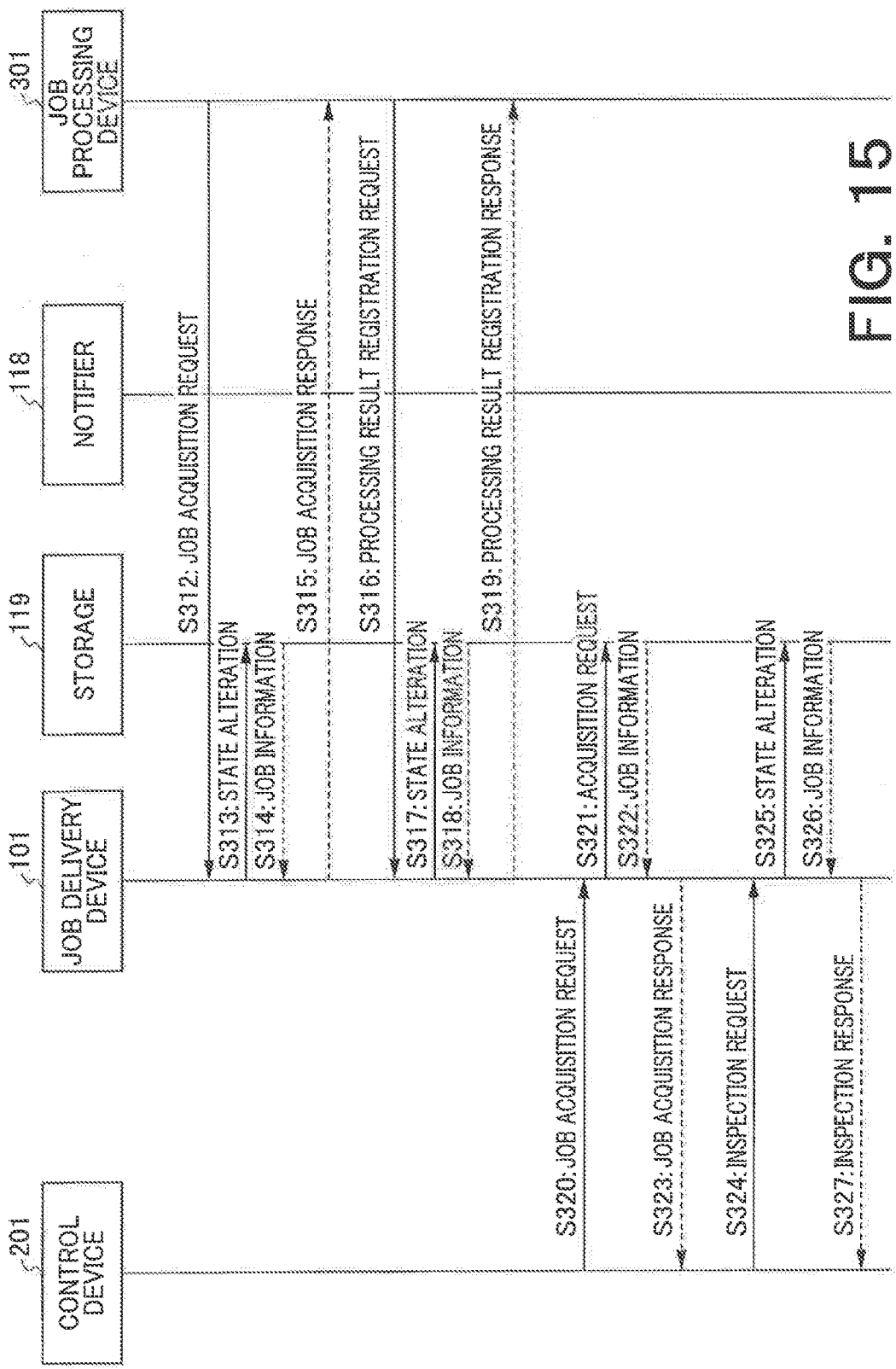
FIG. 15 is a diagram showing a sequence following that in FIG. 14.

FIG. 14 shows an example of a specific sequence according to the embodiment. FIG. 15 shows a sequence following that in FIG. 14. In this example, only the job processing device 301 establishes the connection for notification with the notifier 118. Here, for the description, the notifier 118 and the storage 119 are shown as separate blocks from the job delivery device 101.

The job processing device 301 establishes the connection for notification (in this example, the WebSocket connection) with the notifier 118 of the job delivery device 101 (S301a, S301b). The control device 201 sends the job list acquisition request (S302). The job delivery device 101 acquires jobs satisfying a condition designated in the job list acquisition request (for example, jobs having the user ID of the job processing device 301 are designated), from the database of the storage 119 (S303, S304). The job delivery device 101 returns the job list acquisition response (see FIG. 7) containing the acquired jobs (S305). The control device 201, for example, displays the acquired job list on a screen, and thereby, the user confirms the contents of demanded processes.

The control device 201 creates the job creation request (see FIG. 2), based on the instruction from the user, or the like, and sends it to the job delivery device 101 (S306). The job delivery device 101 creates a job based on the job creation request, and registers it in the database of the storage 119 (S307, S308). The job delivery device 101 sets the state of the job to "created". The job delivery device 101 sends the job creation response containing the created job, to the control device 201 (S309).

Further, the job delivery device 101 outputs a notification instruction to the notifier 118 (S310), for notifying the creation of the job to the job processing device 301, and the notifier 118 notifies the creation of the job to the job processing device 301, using the connection for notification established in advance (S311). The notification, for example, contains the job ID, and does not contain the content of the process that is executed by the job processing device 301.

The job processing device 301 sends the job acquisition request containing the job ID notified from the job delivery device 101 (S312). The job delivery device 101 updates the corresponding job (S313, S314). On this occasion, the state of the job is altered to "assigned". The job acquisition response (see FIG. 8) containing the updated job is sent to the job processing device 301 (S315). The job processing device 301 analyzes the job, and thereby, gains the content of the process that is required to the own device. For example, when the apparatus on which the own device is mounted is a television and the content of the job is to turn on the power source of the television by an execution time limit, the job processing device 301 turns on the power source of the television before the exceeding of the execution time limit. The power source may be turned on a certain time (for example, 1 minute) before the execution time.

After completing the execution of the process that is requested in the job, the job processing device 301 sends the processing result registration request (see FIG. 9) to the job delivery device 101 (S316). The job delivery device 101 judges that the execution of the process has been completed, based on the processing result registration request, and updates the corresponding job (S317, S318). On this occasion, the state of the job is updated to "executed". The job delivery device 101 sends the processing result registration response (see FIG. 10) containing the updated job, to the job processing device 301 (S319). The job processing device 301 confirms the processing result registration response, and thereby, can confirm that the completion of the execution of the process has been registered in the job delivery device 101 (for example, can confirm it when the processing result registration response has the confirmation code or the execution time).

The control device 201 sends the job acquisition request containing the ID of the corresponding the job (S320), for confirming whether the execution of the process designated in the job creation request has been completed. The job delivery device 101 acquires the job designated in the job acquisition request, from the storage 119 (S321, S322). The job delivery device 101 sends the job acquisition response containing the whole or a part of the information of the acquired job, to the control device 201 (S323).

The control device 201 receives the job acquisition response, and based on this, confirms that the execution of the process has been completed (for example, confirms it from the value of the attribute "confirmedAt"). The control device 201 reads the confirmation code contained in the job acquisition response, and sends the inspection request (see FIG. 11) containing the confirmation code (S324). The job delivery device 101 reads the job concerning the inspection request, from the storage 119, and confirms whether the confirmation code contained in the read job matches the confirmation code contained in the inspection request (S325, S326). In the case of the matching, the inspection is completed, and the inspection response (see FIG. 12) is sent to the control device 201 (S327). The control device 201 receives the inspection response, and confirms that the inspection has been successfully completed. That effect may be displayed on the screen.

In the case of knowing that the process has not been completed yet based on the job acquisition response in step S323, the control device 201 may send the job acquisition request again after the elapse of a certain time or an arbitrary time.

In the above-described sequence, the connection for notification is established between the job delivery device 101 and the job processing device 301, but there can be a pattern in which the connection for notification is not established. In this case, a step of sending the job list acquisition request from the job processing device 301 is provided before the sending of the job acquisition request in step S312.

Further, in the above-described sequence, as the notification in step S311, a part (the job ID and the like) of the information about the job is notified, but there can be pattern in which the whole of the information about the job is sent. In this case, at the time point of the notification in step S311, the state of the job transitions to "assigned". In this case, steps S312 to S315 are unnecessary. Here, even in the case of sending not the whole of the information about the job but a specific part (the job ID, the content of the process, the time limit and the like) of the information, the same sequence can be adopted.

In the above-described sequence, the connection for notification is not established between the job delivery device 101 and the control device 201, but there can be a pattern in which the connection for notification is established. In this case, it is only necessary to receive the processing result registration request in step S316 and to notify the updated job after the update of the job. In this case, steps S320 to S323 are unnecessary. Alternatively, only the job ID may be notified, instead of the notification of the updated job. In this case, the control device 201 only needs to execute step S320 after confirming the notification of the job ID.

In the embodiment, the inspection is performed after the completion of the process, but there can be a configuration in which the inspection is not performed. The job creation request to be sent from the control device 201 may contain the Information of whether the inspection is necessary. The job delivery device 101 may determine whether to perform the inspection operation, in accordance with the information. Further, in the embodiment, the job is removed after the inspection, but there can be a configuration in which the job is not removed. For example, the job may be held until the viewing time limit, or the job may be held until the removal request is received.

According to the job delivery device, the control device and the job processing device can also be realized, for example, by using a general purpose computer as basic hardware. Specifically, the functions of the devices can be realized by causing a processor incorporated in the above computer device to execute the program. At this point, the devices may be realized by installing in advance the above program on the computer. Alternatively, it may be realized by storing the program in a storage medium such as CD-ROM or distributing the program via a network, and thus installing this program on the computer device as appropriate. Also, the storage in the job delivery device can be realized by using as appropriate a memory built in or externally connected to the above computer device, hard disk, or a storage medium such as CD-R, CD-RW, DVD-RAM, and DVD-R.

The terms used in this embodiment should be construed in their broad senses. For example, the term "processor" may encompass a general purpose processor, a central processing unit (CPU), a microprocessor, a digital signal processor (DSP), a controller, a microcontroller, a state device, and the like. The term "processor" may denote, depending on the situations, an application specific integrated circuit, a field programmable gate array (FPGA), a programmable logic device (PLD), and the like. The term "processor" may denote combination of microprocessors, combination of a DSP and a microprocessor, and one or more microprocessors that operates in cooperation with a DSP core.

As another example, the term "memory" may encompass any appropriate electronic components that can store electronic information. "Memory" may denote a random access memory (RAM), a read-only memory (ROM), a programmable read-only memory (PROM), an erasable programmable read-only memory (EPROM), an electrically erasable PROM (EEPROM), a non-volatile random access memory (NVRAM), a flash memory, and a magnetic or optical data storage, which can be read by the processor. When the processor writes and/or reads information to/from the memory, it can be said that the memory carries out electrical communications with the processor. The memory may be integrated into the processor. It can be said in this case as well that the memory is carrying out electrical communications with the processor.

The present invention is not limited to the above-described embodiments as such and can be effectuated with various modifications made to the constituent components at the actual stage of implementation without departing from the scope of the present invention. Also, various inventions may be constructed by appropriate combination of the constituent components disclosed in the above embodiment. For example, some of the constituent components may be eliminated from the entire set of the constituent components presented in the context of the embodiments. Further, constituent components that pertain to different embodiments may be combined as appropriate.

The invention claimed is:

1. A communication device communicating with each of a control device and a processing device through a network, comprising:
    communication circuitry configured to receive a first request from the control device, wherein the first request designates a process to be executed by the processing device the first request contains a request value of a first time limit of the process, and the request value of the first time limit can be individually specified by the control device; and
    processing circuitry configured to:
        create a job when the first request is received, the job containing instruction information for execution of the process designated by the first request and the first time limit of the process,
        control a state of the job and set the state of the job to a first state when the job is created, the first state indicating that the job has been created and has not yet been assigned to the processing device,
        transition the state of the job from the first state to a second state when a job acquisition request is received from the processing device during a period of time in which the job is in the first state, the second state indicating that the job is assigned to the processing device, and transmit a first response including the job to the processing device via the communication circuitry,
        transition the state of the job from the second state to a third state when a second request indicating that all or part of the job is executed in the processing device is received from the processing device during a period of time in which the job is in the second state, the third state indicating that all or part of the job has been executed in the processing device, specify a state of the job when the processing circuitry receives a third request for the job from the control device or the processing device, the specified state being either one of a plurality of states including the first state, the second state and the third state, and control execution of the third request based on the specified state of the job and the first time limit of the job.

2. The communication device according to claim 1, wherein the processing circuitry sets the first time limit to the request value in a case where the request value is equal to or less than an upper limit value or equal to or more than a lower limit value, and sets the first time limit to a value equal to or less than the upper limit value or a value equal to or more than the lower limit value when the request value is more than the upper limit value or less than the lower limit value.

3. The communication device according to claim 1, wherein the processing circuitry determines the first time limit based on a type of the process designated in the first request.

4. The communication device according to claim 1, wherein the processing circuitry:

transmits a second response containing an execution status of the process when an acquisition request of the execution status of the job is received from the control device during a period of time in which the job is in the third state, and the acquisition request is the third request, transitions the state of the job from the third state to a fourth state when an inspection request of the job is received from the control device during a period of time in which the job is in the third state, the fourth state indicating that completion of execution of the job is confirmed, and the inspection request is the third request, and does not execute the second request if the second request is again received from the processing device during a period of time in which the job is in the fourth state.

5. The communication device according to claim 4, wherein the processing circuitry:

removes the job when a removal request for the job is received from the control device during a period of time in which the job is in the first state, and the removal request is the third request, and does not execute the removal request if the removal request is received from the control device during a period of time in which the job is in the second state or the third state.

6. The communication device according to claim 1, wherein the first time limit is a time limit until which information indicative of an execution status of the job can be transmitted to the control device, and the processing circuitry specifies the job having expired the first time limit, and removes the specified job.

7. The communication device according to claim 1, wherein the first time limit is a time limit of execution of the process, the processing circuitry sets the state of the job to a fifth state when the job expires the first time limit, the fifth state indicating that the job is invalid, and the processing circuitry transmits a third response indicating that the job is invalid to the control device when an acquisition request of the execution status of the job is received from the control device during a period of time in which the state of the job is in the fifth state or transmits the third response to the processing device when the acquisition request is received from the processing device during a period of time in which the state of the job is in the fifth state.

8. The communication device according to claim 1, wherein the processing circuitry:

establishes connection for notification with the processing device and keeps the connection, and sends the job or an ID identifying the job to the processing device through the connection, when the job is created.

9. A communication system comprising:

the communication device according to claim 1;

the control device; and the processing device.

10. The communication device according to claim 1, wherein the communication circuitry receives an update request of the job as the third request, and the processing circuitry update the job when the update request of the job is received from the control device during a period of time in which the job is in the first state.

11. The communication device according to claim 1, wherein the communication circuitry does not execute the update request if the update request is received from the control device during a period of time in which the job is in the second state.

12. The communication device according to claim 11, the communication circuitry transmits an error response to the control device if the update request is not executed.

13. A communication method performed in a computer communicating with each of a control device and a processing device through a network, comprising:

receiving a first request from the control device, wherein the first request designates a process to be executed by the processing device, the first request contains a request value of a first time limit of the process, and the request value of the first time limit can be individually specified by the control device;

creating a job when the first request is received, the job containing instruction information for execution of the process designated by the first request and the first time limit of the process;

controlling a state of the job and setting the state of the job to a first state when the job is created, the first state indicating that the job has been created and has not yet been assigned to the processing device;

transitioning the state of the job from the first state to a second state when a job acquisition request is received from the processing device during a period of time in which the job is in the first state, the second state indicating that the job is assigned to the processing device, and transmitting a first response including the job to the processing device;

transitioning the state of the job from the second state to a third state when a second request indicating that all or part of the job is executed in the processing device is received from the processing device during a period of time in which the job is in the second state, the third state indicating that all or part of the job has been executed in the processing device;

specifying a state of the job when the processing circuitry receives a second third for the job from the control device or the processing device, the specified state being either one of a plurality of states including the first state, the second state and the third state; and controlling execution of the third request based on the specified state of the job and the first time limit of the job.

14. A non-transitory computer readable medium storing a computer program stored therein which when executed by a computer communicating with each of a control device and a processing device through a network, causes the computer to execute processing of steps: comprising:

receiving a first request from the control device, wherein the first request designates a process to be executed by the processing device, the first request contains a request value of a first time limit of the process, and the request value of the first time limit can be individually specified by the control device;

creating a job when the first request is received, the job containing instruction information for execution of the process designated by the first request and the first time limit of the process;

controlling a state of the job and setting the state of the job to a first state when the job is created, the first state indicating that the job has been created and has not yet been assigned to the processing device;

transitioning the state of the job from the first state to a second state when a job acquisition request is received from the processing device during a period of time in which the job is in the first state, the second state indicating that the job is assigned to the processing device, and transmitting a first response including the job to the processing device;

transitioning the state of the job from the second state to a third state when a second request indicating that all or part of the job is executed in the processing device is received from the processing device during a period of time in which the job is in the second state, the third state indicating that all or part of the job has been executed in the processing device;

specifying a state of the job when the processing circuitry receives a third request for the job from the control device or the processing device, the specified state being either one of a plurality of states including the first state, the second state and the third state; and controlling execution of the third request based on the specified state of the job and the first time limit of the job.

* * * * *